Oct. 12, 1948.     J. W. RICHBOURG     2,451,412
PRESSURE SWITCH
Filed Jan. 14, 1946     2 Sheets-Sheet 1
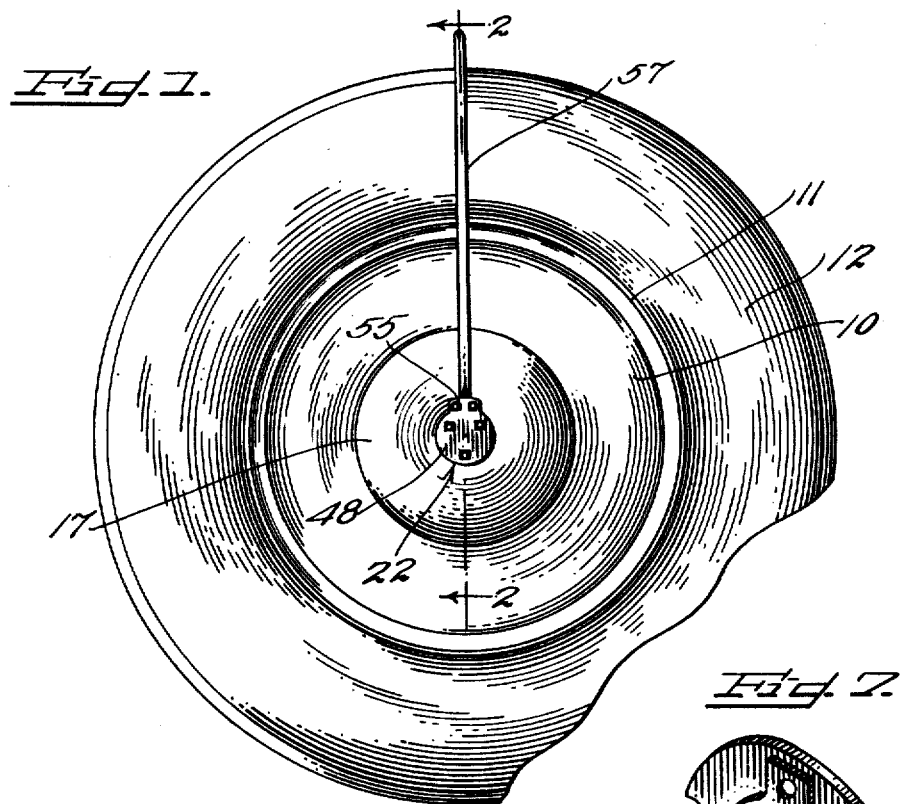
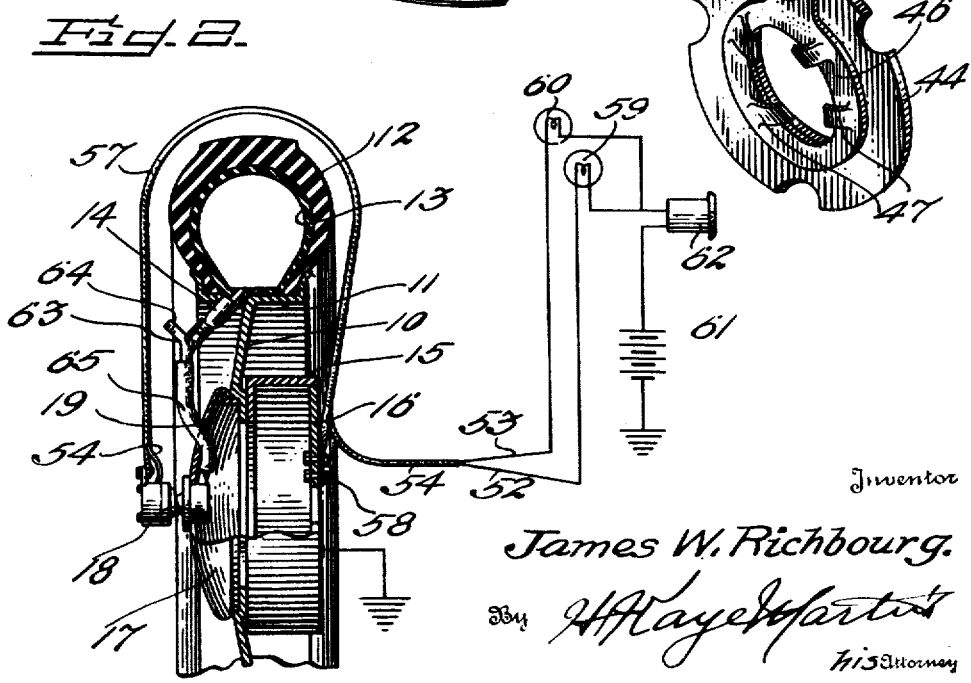
Inventor
James W. Richbourg.

Oct. 12, 1948. J. W. RICHBOURG 2,451,412
PRESSURE SWITCH
Filed Jan. 14, 1946 2 Sheets-Sheet 2
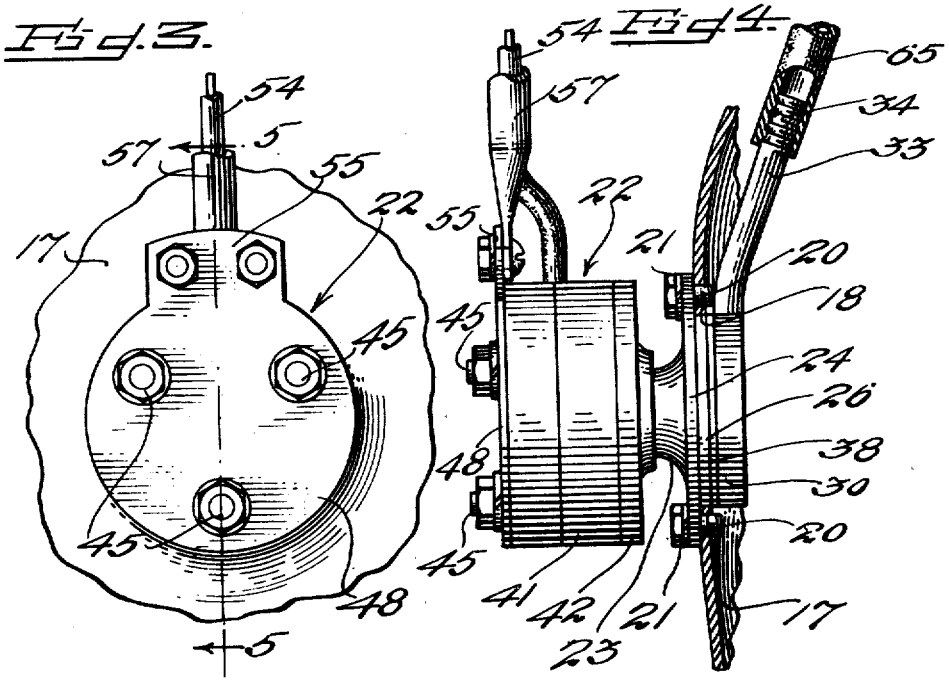
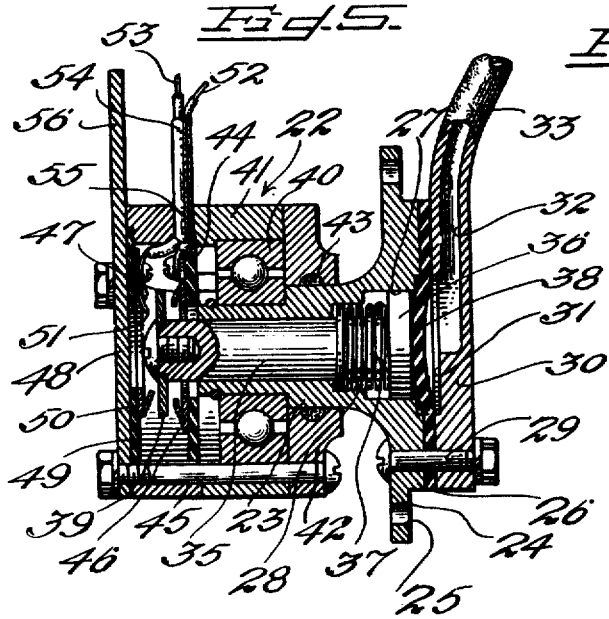
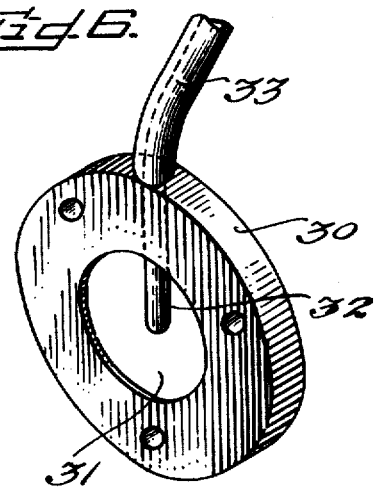
Inventor
James W. Richbourg.
his Attorney Patented Oct. 12, 1948

2,451,412

UNITED STATES PATENT OFFICE 2,451,412

PRESSURE SWITCH

James W. Richbourg, Vidalia, Ga., assignor of two-fifths to G. H. Gibson, Vidalia, Ga.

Application January 14, 1946, Serial No. 641,058

4 Claims. (Cl. 200—58)

This invention relates to a pressure alarm and more particularly to a pressure alarm system for pneumatic tires.

The primary object of the invention is to warn the driver of a motor vehicle when any one of the tires thereon is over-inflated or under-inflated.

Another object is to produce a warning which is visible to the driver without requiring that he leave his seat in the vehicle when the pressure in any one tire exceeds a predetermined value or falls below another predetermined value.

A further object is to facilitate the maintenance of the tire pressure in each tire within a predetermined range.

Among its features my invention embodies a tubular body, a cover plate on the body having an air chamber aligning with the opening in the tubular body, a diaphragm between the cover plate and the body, a plunger slidable in the body, means yieldingly to urge the plunger against the diaphragm, a pair of signaling circuits and means carried by the plunger for closing one or the other of the signaling circuits when the pressure in the air chamber falls below or exceeds a predetermined value.

Other features include visual signaling means within the range of vision of the driver of the vehicle to indicate over or under inflation of any tire in use thereon.

In the drawings:

Figure 1 is a fragmentary side view of a vehicle wheel equipped with any improved tire pressure signaling means;

Fig. 2 is a vertical sectional view taken substantially along the line 2—2 of Fig. 1;

Fig. 3 is an enlarged fragmentary side view of the wheel showing the signaling attachment in place thereon;

Fig. 4 is an edge view of Fig. 3 showing the hub cap in section;

Fig. 5 is a vertical sectional view taken substantially along the line 5—5 of Fig. 3;

Fig. 6 is an enlarged perspective view of the diaphragm plate, showing the air pressure chamber therein; and Fig. 7 is an enlarged perspective view of one of the contact plates.

Referring to the drawings in detail, a vehicle wheel 10 is fitted with the usual rim 11 on which a pneumatic tire 12 is mounted in the conventional manner. This tire contains the usual inner tube 13 carrying a conventional valve stem 14 from which the usual tire valve has been extracted. The wheel 10 is mounted on the conventional hub carrying a brake drum 15, the inner end of which is closed by a cover plate on disk 16 fixed to the axle housing (not shown) in a conventional manner. The fastening bolts for attaching the wheel to the hub are enclosed in a hub cap 17 which is of conventional form except for the fact that it is provided with an opening 18 which aligns with the axis of the wheel 10 and a second opening 19 which is radially offset from the opening 18. The opening 18 is surrounded with an annular row of spaced internally screw threaded holes 20 for the reception of attaching bolts 21 by means of which the tire pressure gage designated generally 22 is secured to its respective wheel.

The pressure gage 22 comprises a tubular body 23 carrying at one end an outstanding annular attaching flange 24 which is pieced at spaced intervals with openings 25 through which the bolts 21 extend. A concentric cylindrical projection 26 extends from the face of the flange 24 and is of a size snugly to fit the opening 18 in order to center the pressure gage 22 on the hub cap 17. Opening into the body 23 at the end carrying the flange 24 is an enlarged axial bore 27, and extending inwardly from the inner end of the bore 27 is a bore 28 of somewhat lesser diameter of the bore 27 but still greater in diameter than the bore in the tubular body 23 to form a shoulder against which is adapted to seat a compression coil spring to be more fully hereinafter described.

Bolted as at 29 to the flange 24 and closing the outer end of the enlarged bore 27 is a cover plate 30 having formed axially of its inner face a pressure chamber 31 which is of slightly greater diameter than the bore 27 and which lies concentric therewith when the parts are assembled. Entering the cover plate 30 from its edge is a radial passage 32, the inner end of which communicates with the chamber 31 while its outer end opens into a radially extending tube 33, the outer end of which is ribbed as at 34 for a purpose to be more fully hereinafter described.

Slidably mounted in the tubular body 23 is a plunger 35 provided at one end with a head 36 which is adapted to be received in the bore 27. A compression coil spring 37 surrounds the plunger 35 and one end of said spring seats against the end of the bore 28 while its opposite end bears on the head 36. It will thus be seen that the plunger 35 is yieldingly urged toward the cover plate 30. Interspersed between the head 36 of the plunger 35 and the chamber 31 in the cover plate 30 is a diaphragm 38 formed of a flexible and extensible air retaining material such as rubber. The end of the plunger 35 opposite that carrying the head 36 projects beyond the end of the tubular body and has attached to it a contact disk 39, the purpose of which will more fully hereinafter appear.

Surrounding the tubular body 23 near the end opposite the flange 24 is an anti-friction bearing 40 upon which is supported a cylinder 41, one end of which is closed by a cover 42 carrying a sealing ring 43 which rides the external surface of the tubular body 23 to exclude dust and dirt from the interior of the gage 22. The cylinder 41 is made up of a plurality of separate cylindrical units between adjacent ends of which is clamped an insulating ring 44 by means of longitudinally extending clamping bolts 45. This ring 44 carries on one face a contact ring 46 carrying spring contact fingers 47 which when the plunger 35 is moved under the influence of the spring 37 is adapted to be engaged by the contact disk 39. Clamped to the outer end of the cylinder 41 by means of the bolts 45 is a cover plate 48 and mounted at the end of the cylinder 41 and adjacent the cover plate 48 is an insulating ring 49 carrying on its inner face a contact ring 50 carrying contact fingers 51 which are adapted to be engaged by the contact disk 39 when the plunger is moved a predetermined distance against the effort of the spring 37.

Connected to each respective contact ring 46 and 50 is a conductor 52 and 53 carried in a cable 54 which leads outwardly through a radial opening 55 in the cylinder 41.

The cover plate 48 is provided with a radial extension 56 to which is bolted a radially extending conduit 57. This conduit is arched over the wheel 10 as illustrated in Figs. 1 and 2, and the end opposite that which is attached to the radial extension 56 is secured as at 58 to the plate 16 previously described.

The conductor 52 leads to a low pressure signal 59 preferably mounted on the instrument board of the vehicle and the conductor 53 leads to a high pressure signal 60 mounted near the signal 59. The terminals of the signals 59 and 60 are opposite these to which the conductors 52 and 53 join one another and are preferably connected with the terminal of the battery 61 opposite the grounded terminal through the medium of the ignition switch 62.

Fitted on the valve stem 14 is one branch of a Y-shaped fitting 63, the opposite branch 64 of which is provided with a conventional tire valve, while the stem of the Y-shaped fitting is corrugated externally to enter one end of a flexible tube or bore 65. The end of the tube or bore 65 opposite that connected to the stem of the Y-shaped fitting 63 is passed through the opening 19 in the hub cap 17 and slipped over the corrugated or ribbed end 34 of the tube 33. It will thus be seen that when the tire 12 is inflated the air therefrom will enter the chamber 31 of the gage 22.

In operation it will be understood that the tire 12 may be inflated in the conventional manner by introducing air under pressure into the valved branch 64 of the Y-shaped fitting 63. Since the valve stem 14 is open to the stem of the Y-shaped fitting, air will be admitted to the chamber 31 so as to exert pressure on the diaphragm 38 and cause it to move the head 36 against the urge of the spring 37. When the pressure in the tire is sufficient the plunger 35 will be moved so as to cause the contact disk 39 to disengage the fingers 47 and thus break contact through the low pressure signal 59. Should the pressure introduced into the tire exceed a predetermined value, the plunger 35 will move sufficiently to cause the contact disk to engage the contact fingers 51 and establish a flow of electrical current through the high pressure signal 60. When the pressure in the tire lies between predetermined limits the contact disk 39 will be between and out of contact with either the fingers 47 or 51. It is to be understood that a complete signaling system is to be installed for each tire on the vehicle so that should the pressure in any one tire fall below or exceed a predetermined value, the fact will be registered with the driver immediately.

While in the foregoing there has been shown and described the preferred embodiment of this invention, it is to be understood that minor changes may be made in the details of construction, combination and arrangement of parts without departing from the spirit and scope of the invention as claimed.

This application is a continuation in part of my copending application filed on or about the 1st day of June 1945, Serial Number 597,103, now abandoned.

I claim:

1. An air pressure indicator comprising a tubular body, a cover plate on one end of the body having an air chamber aligning with the bore in said body, a diaphragm between the air chamber and the body, a plunger slidable in the tubular body, means yieldingly to urge the plunger against the diaphragm, means establishing communication between the air chamber and a pressure chamber, an anti-friction bearing on the tubular body, a housing mounted on the anti-friction bearing, a contact on the plunger within the housing and spaced contacts carried by the housing adapted to be engaged by the contact on the plunger for closing an electrical signaling circuit.

2. An air pressure indicator comprising a tubular body, a cover plate on one end of the body having an air chamber aligning with the bore in said body, a diaphragm between the air chamber and the body, a plunger slidable in the tubular body, means yieldingly to urge the plunger against the diaphragm, means establishing communication between the air chamber and a pressure chamber, an anti-friction bearing on the tubular body, a housing mounted on the anti-friction bearing, a contact on the plunger within the housing, a contact in the housing adapted to be engaged by the contact on the plunger to close an electrical circuit through a low pressure signal and a second contact in the housing adapted to be engaged by the contact on the plunger to close an electrical circuit through a high pressure signal.

3. An air pressure indicator comprising a tubular body, a cover plate on one end of the body having an air chamber aligning with the bore in said body, a diaphragm between the air chamber and the body, a plunger slidable in the tubular body, means yieldingly to urge the plunger against the diaphragm, means establishing communication between the air chamber and a pressure chamber, an anti-friction bearing on the tubular body, a housing mounted on the anti-friction bearing, a contact on the plunger within the housing, spaced contacts carried by the housing adapted to be engaged by the contact on the plunger for closing an electrical signaling circuit, and means for mounting the tubular body on the hub cap of a vehicle wheel.

4. An air pressure indicator comprising a tubular body, a cover plate on one end of the body having an air chamber aligning with the bore in said body, a diaphragm between the air chamber and the body, a plunger slidable in the tubular body, means yieldingly to urge the plunger against the diaphragm, means establishing communication between the air chamber and a pressure chamber, an anti-friction bearing on the tubular body, a housing mounted on the anti-friction bearing, a contact on the plunger within the housing, a contact in the housing and adapted to be engaged by the contact on the plunger to close an electrical circuit through a low pressure signal, a second contact in the housing adapted to be engaged by the contact on the plunger to close an electrical circuit through a high pressure signal, and means for mounting the tubular body on the hub cap of a vehicle wheel.

JAMES W. RICHBOURG.

REFERENCES CITED

The following references are of record in the file of this patent:

UNITED STATES PATENTS

| Number | Name | Date |
|---|---|---|
| 1,398,992 | Zimmerman | Dec. 6, 1921 |
| 1,652,733 | Rouch | Dec. 13, 1927 |
| 2,040,891 | Wright et al. | May 19, 1936 |
| 2,190,117 | Griffith | Feb. 13, 1940 |
| 2,430,428 | Katcher | Nov. 4, 1947 |

OTHER REFERENCES

Article on page 410 of September 1928 edition of Science and Invention.